United States Patent [19]
Warshawsky et al.

[11] 3,903,612
[45] Sept. 9, 1975

[54] APPARATUS FOR PREHEATING SOLID PARTICULATE MATERIAL

[75] Inventors: Jay Warshawsky, Allentown; Thomas R. Lawall, Emmaus, both of Pa.

[73] Assignee: Fuller Company, Catasauqua, Pa.

[22] Filed: June 26, 1974

[21] Appl. No.: 483,265

[52] U.S. Cl. .................... 34/168; 34/170; 34/174; 432/58; 432/106
[51] Int. Cl. ............................................ F26b 17/14
[58] Field of Search ............ 34/165, 168, 170, 174; 432/58, 106

[56] References Cited
UNITED STATES PATENTS

| | | | |
|---|---|---|---|
| 2,671,057 | 3/1954 | McClure | 34/174 X |
| 3,305,939 | 2/1967 | Sonnenschein et al. | 34/168 X |
| 3,837,092 | 9/1974 | Mayer | 34/168 |

Primary Examiner—John J. Camby
Attorney, Agent, or Firm—Frank H. Thomson

[57] ABSTRACT

Apparatus for preheating solid particulate material which is to be further subjected to thermal processing in a furnace. The preheater includes a vessel having an inlet for material to be preheated, an outlet for preheating material, an inlet for hot gases and an outlet for spent preheating gases. Internals of the vessel define a preheating zone. A plurality of spaced apart angular wall members are positioned within the vessel to define conduits which extend from the preheating zone to the spent gas outlet. A valve is mounted in each of these conduits and control means is provided to open and close the valves. The opening and closing of the valves controls the location from which gas is discharged from the preheating zone to thereby control the length of the preheating zone. This is used to control the amount of preheat of the material.

11 Claims, 3 Drawing Figures

PATENTED SEP 9 1975          3,903,612

APPARATUS FOR PREHEATING SOLID PARTICULATE MATERIAL

BACKGROUND OF THE INVENTION

This invention relates to gas solids heat exchangers and in particular to a preheater for solid particulate material which is to be further treated in a furnace.

Prior to the present invention it was known to calcine limestone and heat raw materials for manufacturing lightweight aggregate in a furnace such as a rotary kiln in order to produce lime and lightweight aggregate, respectively. Also prior to the present invention it was known that it is desirable to employ the exhaust gases from the furnace such as a rotary kiln to preheat the raw material supplied to the rotary kiln. This is done in order to reduce the fuel requirements of the process.

One prior preheating apparatus is shown in prior U.S. Pat. application Ser. No. 378,289, filed July 11, 1973, now U.S. Pat. No. 3,832,128. In the method and apparatus shown in that prior application, the amount of preheating which takes place in the preheating apparatus is controlled by controlling the length of the preheating zone. In this manner, the temperature at which material is discharged from the preheater into the final treating furnace can be controlled. In addition, the pressure drop across the preheating apparatus can be controlled to prevent overloading of the auxiliary equipment. A further advantage of controlling the length of the preheating zone, is that if the fuel being burned in the main furnace includes sulphur or other impurities which it is desired to keep out of the material being treated, the gas to the preheater can be made to contact the raw material for a short period of time in order to reduce the liklihood of the transfer of these impurities to the material being treated.

The present invention relates to an improvement over the above-mentioned U.S. Patent Application in the means for controlling the length of the gas-solids contact zone within the preheater vessel.

SUMMARY

It is the principal object of this invention to provide a gas solids heat exchange apparatus which includes an improved control arrangement.

It is a further object of this invention to provide a gas solids heat exchange apparatus which includes a novel means for controlling the amount of contact between the raw material and the preheating gas.

The foregoing and other objects will be carried out by a gas-solids heat exchange apparatus including a vessel having an inlet for solid particulate material, an outlet for solid particulate material, an inlet for gaseous fluid; an outlet for gaseous fluid; means defining a gas-solids contact zone intermediate said inlet and said outlet for gaseous fluid and intermediate said inlet and said outlet for solid particulate material whereby solid particulate material which moves from said inlet for solid particulate material to said outlet for solid particulate material passes through the gas-solids contact zone; means for directing substantially all of the gaseous fluid through the gas-solids contact zone for heat exchange contact with the solid particulate material; and means for varying the length of the gas-solids contact zone through which substantially all of the gaseous fluid is directed; the improvement comprising said means for varying the length of the gas-solids contact zone including a plurality of conduits having their inlets positioned along the length of said gas-solids contact zone and their outlets flow connected to the outlet for gaseous fluid; and a plurality of valve means, each mounted in one of said couduits for controlling the flow of gas from said gas-solids contact zone to the outlet for gaseous fluid through the conduit in which it is mounted to thereby control the length of the gas-solids contact zone.

BRIEF DESCRIPTION OF THE DRAWINGS

The invention will be described in connection with the annexed drawings wherein.

DESCRIPTION OF THE PREFERRED EMBODIMENT

Figure 1:
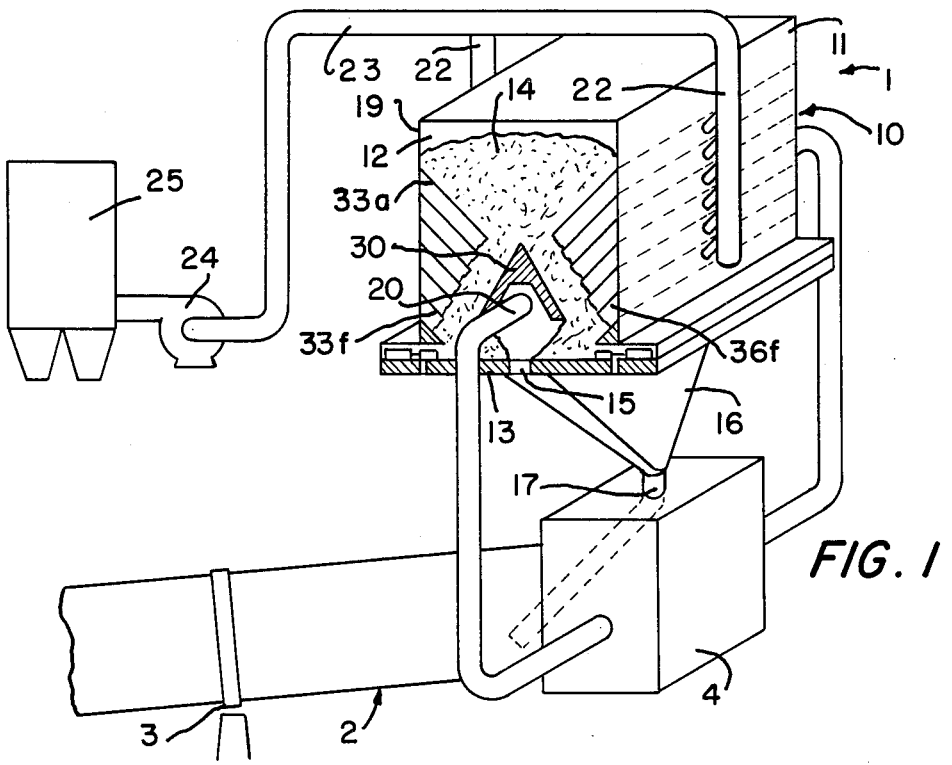
FIG. 1 is a perspective view of the preheater apparatus of the present invention and an associated furnace.
Figure 2:
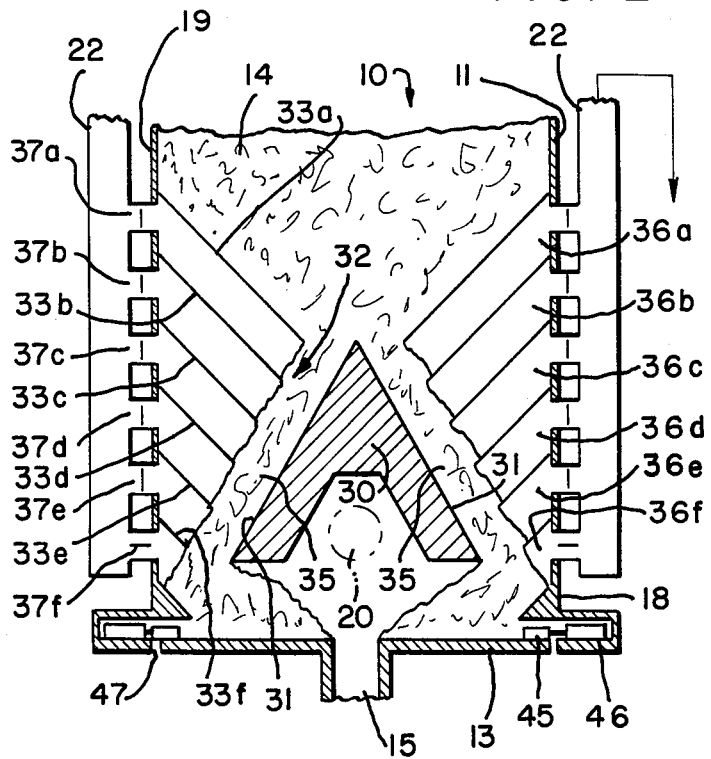
FIG. 2 is a sectional view of the preheating apparatus of the present invention.
Figure 3:
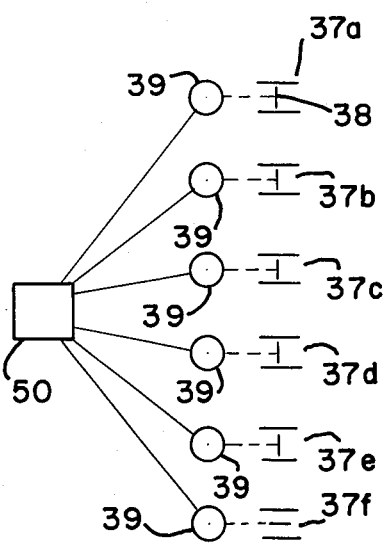
FIG. 3 is a diagrammatic view of the control arrangement of the present invention.

Referring to FIG. 1, there is shown a gas-solids heat exchanger or preheating apparatus for solid particulate material generally indicated at 1. The final treating furnace such as a rotary kiln 2 is flow-connected to the preheater 1 by means of a manifold 4 and suitable ducts. The kiln 2 is mounted for rotation by means of conventional roller supports and tires, generally indicated at 3. Referring to FIG. 2, the preheater 1 includes a vessel generally indicated at 10, having side walls 11, end walls 12, and a floor 13. The sidewall 11 may include a lower portion 18 having an angular surface and an upper portion 19. There is an inlet 14 for solid particulate material which is suitably connected to a storage bin (not shown). If desired, the storage bin may be an extension of the vessel 10. The vessel 10 also includes an outlet 15 for solid particulate material. The outlet 15 is flow-connected to the kiln 1 by means of a transition duct 16 and a feed conduit 17 which extends through manifold 4.

The vessel 10 also has an inlet 20 for preheating gases which is flow connected to the manifold 4 through conduit 21 for conveying hot exhaust gases from the kiln 1 to the inlet 20.

The vessel 10 includes a pair of outlet conduits 22 for spent preheating gas which are connected by duct 23 to a fan 24 and suitable high-efficiency dust collector 25.

The internals of the vessel 10 includes a bridge member 30 which defines a pair of downwardly and outwardly sloping wall means 31. The inlet 20 for preheating gases is positioned under the bridge means 30. There is also provided within the vessel 10 a plurality of downwardly and inwardly sloping wall means generally indicated at 32 and individually indicated at 33a–f extending from the upper portion 19 of sidewall 11 toward but spaced from the downwardly and inwardly sloping wall means 31. The walls 33 are superimposed and spaced apart to define a plurality of conduits 36a–f having their inlets extending along the length of a gas-solids heat exchange zone 35 and their outlets flow connected to the outlet 22 for gaseous fluid. The gas-solid heat exchange zone is defined by the downwardly and inwardly sloping wall means 31, the plurality of downwardly and inwardly sloping wall means 32, the lower portion 18 of the sidewall 11, the endwall 12 and the floor 13.

A plurality of valve means 37a–f are provided with one of said valves positioned in each of the conduits 36 for controlling flow of gas through the conduit 36 in which the valve means is mounted. This valve means may include a valve member 38 and an associated operator 39. When a particular valve means 37 is opened, gas will flow through the thus opened conduit 36. The general gas flow is from the inlet 20, around the bridge 30, through the preheating zone to one of the conduits 36 and the spent preheating gas outlet conduit 22. The general material flow is from raw material storage to inlet 14, through the preheating zone 35 to solid particulate material outlet 15. In view of the position of the solid particulate material inlet and outlet and the gaseous fluid inlet and outlet and the preheating gas flow is generally countercurrent to the flow of solid particulate material. Although as shown in the drawing the gas inlet 20 appears to be above some of the conduits 36, the direction of gas and material flow is such that all of the conduits 36 are effectively below the gas inlet 20 to achieve countercurrent flow.

Pusher means 45 are positioned in the bottom of the vessel 10 in order to advance material along the floor 13 to the material outlet 15. These pusher means are suitably connected to operators 46 which cyclically reciprocate the pushers at a desired frequency to control the rate at which material flows through the preheater 1. Openings 47 may be provided in floor 13 to permit the discharge of any material which gets behind pushers 45.

Because the inlets to the conduits 36a–f are spaced along the length of the preheating zone 35, with the valve means 37a–f, the length of the preheating or gas-solids contact zone 35 can be controlled. When the lower-most valve means 37f is open and the remaining valves 37 are closed, the preheating gases will flow from inlet 20 through the gas-solids contact zones 35 to the first conduit means 36f to the outlet 22. If the lowermost valve means 37f is closed, and another valve means is open, for example the uppermost valve means 37a then gas from inlet 20 will flow through gas-solids contact zone 35 to the uppermost conduit 36a to outlet 22. It can be readily seen in FIG. 2 that the distance from inlet 20 to the lowermost conduit 36f is substantially shorter than the distance to the uppermost conduit 36a. The preheating gas will be within the preheating zone 35 and in contact with the solid particulate material for a shorter length of time when the lowermost valve means 37f is open than when the uppermost valve means 37a is open. Thus, by controlling the valve means 37 which is open, the length of the preheating zone is controlled. By controlling the length of the preheating zone, the temperature of the material discharged from the preheater 1 can be controlled.

In order to operate the valve means 37 there may be provided a controller 50 operatively connected to the operator 39 of each valve. This means for controlling the valve means may be suitably connected to a temperature sensor, a means for sensing pressure drop across the preheater or other variables. This control 50 can serve to open or close the appropriate valve means 37. If the temperature of the material discharged from the preheater 1 is less than a desired temperature, the length of the preheating zone 35 can be increased by opening a higher valve means 37 and closing the lower valve means.

The controller 50 can be set so that when one of the valve means 37 is open, the remaining valve means are automatically closed. This insures that all of the gas which passes through the preheating zone 35 will be discharged at the desired level thereby insuring the desired length of the gas-solids contact zone 35. For example, if the valve 37c is open permitting gas flow through conduit 36c, all other valves 37 will be closed. If material discharged from the preheater 1 is hotter than desired, the valve 37c is closed and valve 37d is opened so that all gas will now flow through conduit 36d and the preheat zone 35 will be decreased in length.

As an alternative, the controller 50 can be set to operate so that the valve means 37 are sequentially opened and closed. When operated in this manner, the uppermost valve means 37a can be opened followed by the next lower valve means 37b and so on down to the lowermost valve means 37f in order to decrease the length of the gas solids heat exchange zone 35. Because the preheating gas will normally take the easiest flow path, it is reasonably certain that all of the gas will be discharged from the preheating zone 35 at the lowest conduit 36 which is open to fluid flow. In order to increase the length of the preheating zone, the valve means 37 are sequentially closed beginning with the lowermost valve means 37 which is opened and proceeding toward the uppermost valve means 37a. For example, if valve means 37a, b, c and d are open all of the gas will pass through conduit 36d. If it is desired to decrease the length of the preheating zone 35 the valve 37e can be opened and all of the gas will be discharged from the preheating zone 35 at the conduit 36e. On the other hand, if it is desired to increase the length of the preheating zone so that the solid particulate material is exposed to the hot gases for a longer period of time, the valve 37d can be closed and all of the gases will be discharged into conduit 36c.

From the foregoing it should be apparent that the objects of this invention have been carried out. A novel means has been provided for controlling the length of the gas-solids contact zone through which all of the preheating gases pass. In this manner the amount of preheating of the raw material can be controlled.

It is intended that the foregoing be a description of the preferred embodiment and that the invention be limited solely by that which is within the scope of the appended claims.

We claim:

1. A gas-solids heat exchange apparatus including a vessel having an inlet for solid particulate material, an outlet for solid particulate material, an inlet for gaseous fluid and an outlet for gaseous fluid; means defining a gas-solids contact zone intermediate said inlet and said outlet for gaseous fluid and intermediate said inlet and said outlet for solid particulate material whereby solid particulate material which moves from said inlet for solid particulate material to said outlet for solid particulate material passes through the gas-solids contact zone; means for directing substantially all of the gaseous fluid through the gas-solids contact zone for heat exchange contact with the solid particulate material; and means for varying the length of the gas-solids contact zone through which substantially all of the gaseous fluid is directed; the improvement comprising said means for varying the length of the gas-solids contact zone including a plurality of conduits having their inlets positioned along the length of said gas-solids contact zone and their outlets flow connected to the outlet for gaseous fluid; and a plurality of valve means, each mounted in one of said conduits for controlling the flow of gas from said gas-solids contact zone to the outlet for gaseous fluid through the conduit in which it is mounted to thereby control the length of the gas-solids contact zone.

2. A gas-solids heat exchanger according to claim 1 the improvement further comprising means operatively connected to each of said valve means for controlling said valve means whereby when one of said valve means is open, the other of said valve means is closed.

3. A gas-solids heat exchanger according to claim 1 wherein said vessel includes a sidewall, end wall and a floor, a downwardly and outwardly extending wall means mounted in said vessel and spaced from said sidewall and said floor; said inlet for gaseous fluid being positioned under said downwardly and outwardly sloping wall means; said improvement further comprising a plurality of spaced apart, superimposed downwardly and inwardly sloping wall means extending from said sidewall toward but spaced from said downwardly and outwardly sloping wall means; said gas-solids contact zone being defined by said downwardly and outwardly sloping wall means, said plurality of downwardly and inwardly sloping wall means, said floor means, said sidewall and said end wall; one of said plurality of conduits being positioned under each of said downwardly and inwardly sloping wall means.

4. A gas-solids heat exchanger according to claim 3, the improvement further comprising means operatively connected to each of said valve means for controlling said valve means whereby when one of said valve means is open to permit gas flow through the conduit in which it is mounted, the remaining valve means are closed to prevent gas flow through the conduit in which they are mounted.

5. A gas-solids heat exchanger according to claim 4 further comprising means for moving solid particulate material along said floor toward said outlet for solid particulate material.

6. A gas-solids heat exchanger according to claim 3, the improvement further comprising means operatively connected to each of said valve means for sequentially opening said plurality of valve means from the uppermost valve means toward the lowermost valve means for decreasing the length of said gas-solids contact zone and sequentially closing said plurality of valve means for increasing the length of said gas-solids contact zone.

7. A gas-solids heat exchanger according to claim 1 wherein said inlet for gaseous fluid is positioned below said outlet for gaseous fluid and said outlet for solid particulate material is positioned below said inlet for solid particulate material so that the flow of gaseous fluid is generally countercurrent to the flow of solid particulate material.

8. Apparatus for preheating solid particulate material which is to be heat processed in a furnace comprising:
   a vessel having an inlet for solid particulate material to be preheated, an outlet for preheated solid particulate material adapted to be flow connected to a furnace, an inlet for exhaust gases from a furnace for preheating the solid particulate material, and an outlet for spent preheating gases;
   means defining a gas-solids contact zone within said vessel intermediate said inlet and said outlet for gases and intermediate said inlet and outlet for solid particulate material whereby solid particulate material which moves from said inlet for solid particulate material to said outlet for solid particulate material passes through the gas-solids contact zone;
   a plurality of conduit means for conducting spent preheating gas from said gas-solids contact zone to said outlet for spent preheating gas;
   a plurality of valve means, each operatively associated with one of said conduit means for controlling the flow of spent preheating gas through its associated conduit means; and
   means for controlling said valve means for controlling the length of said gas-solids contact zone to thereby control the amount of preheating of the solid particulate material.

9. Apparatus for preheating solid particulate material according to claim 8 wherein said means for controlling said valve means includes means operatively connected to each of said valve means for opening one of said valve means and closing the remaining valve means.

10. Apparatus for preheating solid particulate material according to claim 8 wherein said means for controlling said valve means includes means operatively connected to each of said valve means for sequentially opening said plurality of valve means.

11. Apparatus for preheating solid particulate material according to claim 8 wherein said inlet for exhaust gases from a furnace is below said inlet for solid particulate material and said outlet for solid particulate material is below said outlet for spent preheating gases so that the flow of preheating gases is generally countercurrent to the flow of solid particulate material.

* * * * *